Feb. 22, 1927.

D. C. DAVIS 1,618,274

BLADE LASHING

Filed July 24, 1925

David C. Davis
INVENTOR

WITNESSES:

Patented Feb. 22, 1927.

UNITED STATES PATENT OFFICE.

DAVID C. DAVIS, OF CHESTER, PENNSYLVANIA, ASSIGNOR TO WESTINGHOUSE ELECTRIC & MANUFACTURING COMPANY, A CORPORATION OF PENNSYLVANIA.

BLADE LASHING.

Application filed July 24, 1925. Serial No. 45,789.

My invention relates to elastic fluid turbines, more particularly to the blading thereof, and has for its object the provision of an efficient lashing for the blades which shall be simple of manufacture, easy of application and which shall provide a sturdy lashing for the blades, effective to minimize vibration thereof.

Figure 1:
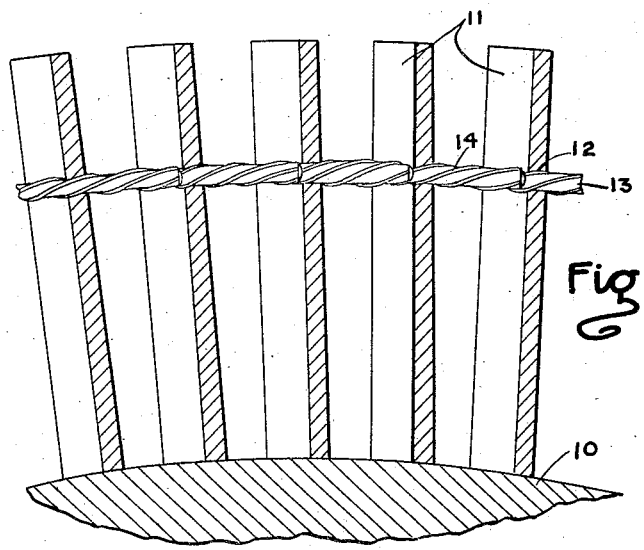
Figure 7:
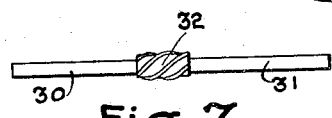
Figure 8:
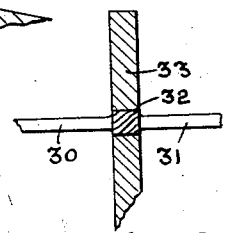
Figure 4:
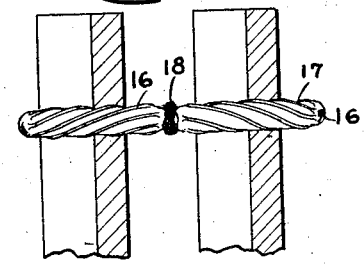
Figure 2:
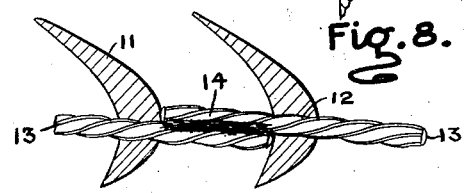
Figure 6:
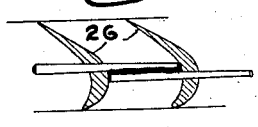
Figure 5:
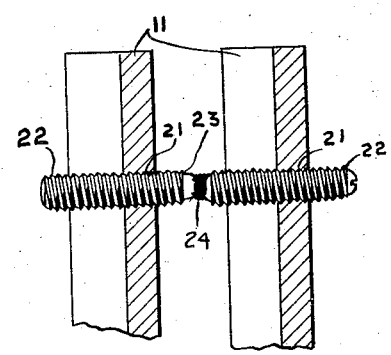
Figure 3:

In the accompanying drawings, forming a part of this specification, Fig. 1 is a fragmentary sectional view showing a turbine blade carrying element having a segment of turbine blades mounted thereon with my improved lashing means applied thereto; Fig. 2 is a sectional view, in plan, of two blades shown in Fig. 1; Fig. 3 is a cross-sectional view of the lashing of Fig. 1; Fig. 4 is a longitudinal sectional view of two blades showing a modified form of my invention; Fig. 5 is a view similar to Fig. 4 showing a further modification of my invention; and Figs. 6, 7 and 8 illustrate still further modifications.

Turbine blade lashing as heretofore known to me has usually consisted of a wire or similar means inserted through a series of aligned holes in a row of turbine blades and joined to the blades either by distortion of the metal in the lashing wire or by fusion of metal such as by soldering or brazing the lashing wire to the blade or both. Difficulties have been encountered with both of these means. In cases where the lashing wire is distorted between the blades in order to form engagement therewith, it has been found that after a comparatively short period of service, the wires have become loosened in the holes, leaving the blades free to vibrate. Where the lashing wire is soldered or brazed to the blade, it has been found that the heat incident to soldering or brazing sometimes has a deleterious effect upon the physical properties of the blades.

In accordance with my invention I have overcome the aforementioned difficulties by providing individual lashing members which are secured to each of the blades and to each other. Preferably each of the members is in threaded engagement with a blade. In the manufacture of the blades, holes are provided therein which may or may not be threaded for the reception of the individual lashing members. Where the holes in the blades are not threaded, individual lashing members may conveniently be formed in the manner described in the patent to Heyman Rosenberg, No. 1,482,151 issued January 29, 1924, and the individual lashing members driven through the holes in the blades. Lashing members formed in this manner and driven into the holes in the blades form a tight engagement with the blades by reason of distortion of metal in the blades. Preferably the members are made long enough so that they overlap between adjacent blades and abut adjacent blades in a row. Upon assembly the overlapping members may be joined together by fusion of metal such as soldering, brazing or welding, at a point remote from the blade structure and thus have no deleterious effect upon the physical properties of the blade.

Referring now to the drawing, I show in Fig. 1 at 10 a fragment of a turbine blade carrying element, for example, a turbine rotor, having a segment of blades 11—11 mounted thereon. Each of the blades 11 is provided with a hole 12 for the insertion of a lashing member. In accordance with this modification the holes 12 are left unthreaded and individual lashing members 13 are provided with steep pitched longitudinally extending threads 14 and are driven into the holes 12, forming a tight engagement with the blades by reason of distortion of the metal of the blade. As shown in Fig. 2 the members 13 are made of sufficient length to overlap between adjacent blades and to abut the front and back respectively of adjacent blades 11 in a segment of blades. When assembled as shown in Fig. 2, the overlapping members form, on their upper sides, a convenient trough for soldering or brazing them together, Fig. 3 clearly showing how the solder or brazing material may be applied.

As is well understood in the art to which my invention relates, the prime function of turbine blade lashing is to minimize vibration of the blades which it does by raising the natural period of vibration of the blades. The greater the stiffness of the lashing between adjacent blades in a row, the greater resistance to vibration is effected, and the natural period of vibration of the blades is raised to a greater degree. It will be apparent from Fig. 2 that lashing so applied is extremely rigid between the blades in a row with very little expense of material of the blade itself. Thus the maximum of resistance to vibration is afforded by this form of lashing. While I have shown all the blades similar, each being provided with a slightly skewed hole, I may, if desired, employ blades having alternate holes slightly offset, so that each pin lies entirely within a plane normal to the turbine axis. Such a structure is shown in Fig. 6 to be described later.

In accordance with the modification shown in Fig. 4, I show lashing members 16—16 having longitudinally extending steep pitched threads 17 thereon similar to the members 13 shown in Figs. 1 and 2. In accordance with this modification, however, the members 16 do not overlap between adjacent blades but are arranged so that their ends abut as at 18 between adjacent blades. Upon assembly, the abutting ends of the members 16 may be joined together by electric welding and thus form a sturdy unitary structure. Preferably alternate members have right-hand threads and the remainder left-hand threads so that the tendency to unscrew is neutralized.

In Fig. 5 I show the blades 11 as being provided with threaded holes 21—21 and having inserted therein individual lashing members 22—22, said members 22 being provided with conventional threads 23—23. In the manufacture of blades the members 22 are screwed into the blades 11 so that upon assembly they abut between adjacent blades as at 24. The abutting members may then be joined together by fusion of metal, preferably electric welding, as shown and described for Fig. 4. Right and left hand threads may also be used to advantage to prevent unscrewing of the assembled structure.

Under certain conditions, I may tightly drive smooth taper pins 26—26 into holes in the blades as shown in Fig. 6, these pins overlapping as in the structure of Figs. 1, 2 and 3 and being subsequently joined to form a strong lashing structure. The pins are not skewed in the blades but alternate holes in the blades are offset.

Referring to Figs. 7 and 8, I may form the lashing members with smooth outer ends 30 and 31 and provide steep pitched threads along a relatively short enlarged body portion 32 which is driven into a blade 33 engaging therewith by distortion of the metal of the blade. With this form of lashing the ends are preferably joined together intermediate blades in a row as shown in Figs. 4 and 5.

From the foregoing it will be apparent that I have devised an improved lashing means for turbine blades wherein the lashing member is in tight engagement with the blade and joined to other lashing members at a point remote from the blade structure between adjacent blades.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. A lashing means for turbine blades comprising cooperating lashing members in threaded engagement with adjacent blades and joined together intermediate the blades by fusion of metal.

2. In a turbine, a row of blades having holes provided therein for the insertion of lashing members, and lashing members in the holes in threaded engagement with the blades and joined together intermediate the blades by fushion of metal.

3. In a turbine, a row of blades having holes provided therein for the insertion of lashing members, lashing members comprising pin-like bodies having high pitched threads extending longitudinally of the bodies driven into the holes and engaging with the blades by reason of deformation of material and joined together intermediate adjacent blades by fusion of metal.

4. Lashing means for a row of turbine blades comprising individual lashing members applied to each blade of a segment of blades, said lashing members overlapping between blades and abutting adjacent blades.

5. Lashing means for a row of turbine blades comprising individual lashing members applied to each blade of a segment of blades, said lashing members overlapping between blades and abutting adjacent blades, and being joined together between blades by fusion of metal.

6. Lashing means for a row of turbine blades comprising individual lashing members having high pitched threads driven through holes in the blades and engaging therewith by reason of deformation of material, said lashing members overlapping between adjacent blades and being joined together by fushion of metal.

7. Lashing means for a row of turbine blades comprising individual lashing members having high pitched threads extending longitudinally thereof driven through holes in the blades and engaging therewith by reason of deformation of material, said lashing members overlapping each other and abutting adjacent blades and being joined together intermediate the blades by fushion of metal.

8. A lashing structure for turbine blades embodying an elongated body penetrating and tightly engaging each blade, respectively, and projecting from each face thereof, said bodies being so disposed that the portions projecting from two immediately adjacent blades lie in side by side relation, and means for joining said portions.

9. A lashing structure for turbine blades embodying an elongated body penetrating and tightly engaging each blade, respectively, and projecting from each face thereof, said bodies being so disposed that the portions projecting from two immediately adjacent blades lie in side by side relation and each abuts against the adjacent face of the opposing blade, and means for joining said portions.

In testimony whereof, I have hereunto subscribed my name this 14th day of July 1925.

DAVID C. DAVIS.